(12) United States Patent
Bond et al.

(10) Patent No.: US 9,004,893 B2
(45) Date of Patent: Apr. 14, 2015

(54) HARD CANDY COTTON CANDY MAKER

(75) Inventors: Gregg Bond, Beverly Hills, CA (US); Edward E. Boughton, III, Ventura, CA (US)

(73) Assignee: Nostalgia Products Group LLC, Green Bay, WI (US)

( * ) Notice: Subject to any disclaimer, the term of this patent is extended or adjusted under 35 U.S.C. 154(b) by 178 days.

(21) Appl. No.: 13/369,221

(22) Filed: Feb. 8, 2012

(65) Prior Publication Data

US 2013/0202726 A1    Aug. 8, 2013

(51) Int. Cl.
*B29C 67/02*    (2006.01)
*A23G 3/34*    (2006.01)
*A23G 3/10*    (2006.01)

(52) U.S. Cl.
CPC ............... *A23G 3/0051* (2013.01); *A23G 3/10* (2013.01)

(58) Field of Classification Search
USPC ............................ 425/5–9, 190, 192 S, 192 R
See application file for complete search history.

(56) References Cited

U.S. PATENT DOCUMENTS

| | | | |
|---|---|---|---|
| 4,842,502 A * | 6/1989 | Tsumita et al. | 425/9 |
| 4,846,643 A * | 7/1989 | Yamamoto et al. | 425/7 |
| 7,438,545 B2 * | 10/2008 | Koike et al. | 425/9 |
| 2007/0031527 A1 | 2/2007 | Koike et al. | |

* cited by examiner

*Primary Examiner* — Joseph S. Del Sole
*Assistant Examiner* — Thukhanh T Nguyen
(74) *Attorney, Agent, or Firm* — Blakely Sokoloff Taylor & Zafman

(57) ABSTRACT

A cotton candy machine including, a base having a switch, motor and heater, and a head The head includes a shaft removably coupled to the motor and a dish coupled to the shaft. A cover is disposed between the dish and a lid. The shaft, cover and lid are in a fixed relationship relative to each other. The cover and the lid form a cavity which is configured to receive hard candy which can be melted when said dish and cover combination are heated to a predetermined temperature. The lid has a lip formed on its top surface around an inner annular ring portion of the lid. The is lip configured to enable the hard candy, when melted, and the head is rotating at a predetermined speed, to form strands or threads which are collectable as cotton candy.

6 Claims, 4 Drawing Sheets

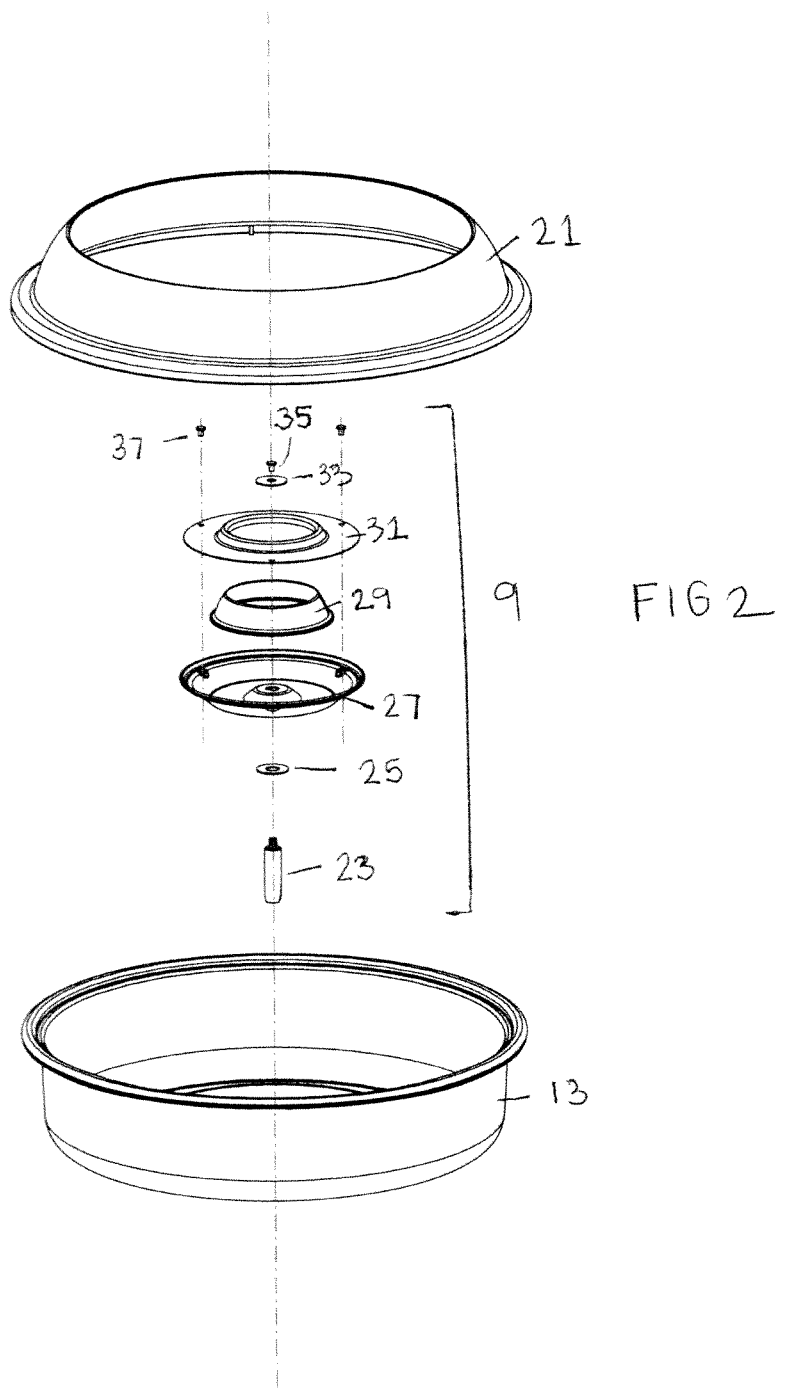

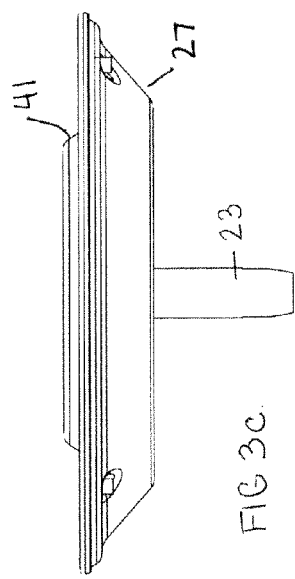
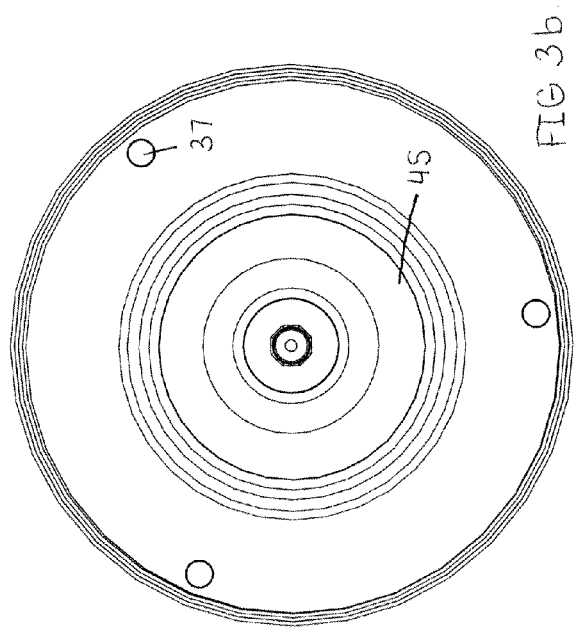
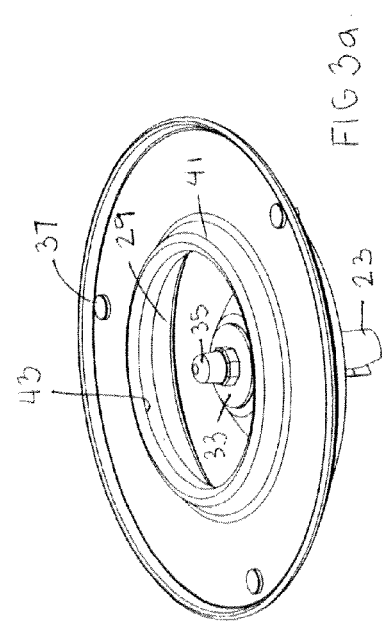

HARD CANDY COTTON CANDY MAKER

BACKGROUND OF THE INVENTION

Machines for making cotton candy are very well known in the art. The machines operate by placing a quantity of granulated sugar into a bowl which is heated and spun at high speed so that as the sugar melts, fine strands are formed within the spinning bowl. Typically, a rod made of stiff paper or the like is inserted into the bowl so that the strands of sugar accumulate on the rod which is twisted so as to form a ball or column of spun sugar which has the appearance of cotton.

In some cases, rather than granulated sugar, candy balls can be utilized. For example, U.S. Patent Application Publication No. 2007/0031527 (Koike et al.) is an example of a cotton candy machine in which candy balls can be utilized. The machine operates by, after placing the candy balls into a cup 57, a disk shaped cover 5 is lowered to a closed state. At this time, a power switch is turned on causing a heating plate 40 to be heated to a high temperature so as to melt the candy balls. After the candy balls have been melted, the melted candy is forced by centrifugal force by the rotation of the melting cup through an ejection gap into a tray 4. After a period of time, the motor is stopped, and the cover 5 is raised to bring the cotton candy machine to an open state so that floss formed in the tray 4 can be collected.

Although Koike et al. discloses a cotton candy machine which is capable of utilizing candy balls rather than granulated sugar to make the cotton candy, it has a complicated structure which requires a cover 5 to be closed over a cup used to melt the candy balls. Further, the Koike et al. device does not appear to be easily convertible to operate as a standard cotton candy machine using granulated sugar instead of hard candy.

BRIEF SUMMARY OF THE INVENTION

The invention is directed to a cotton candy maker which includes a spinning head which can accept hard candy to be melted so as to enable the formation of cotton candy from hard candy. The invented cotton candy machine has as one advantage by merely changing the type of rotating head which is utilized, the machine can be used to make cotton candy using granulated sugar, or cotton candy utilizing hard candy.

That is, the same mechanism is used to make cotton candy from either granulated sugar or hard candy, the only difference being that an easily replaceable spinning head is utilized depending upon the form of the sugar being melted.

In the case of granulated sugar, the rotating head is formed having a flat top surface surrounding an inner annular ring. In the case of hard candy, the rotating head is formed having a top surface with a raised lip surrounding an inner annular ring.

In both cases, the rotating head is formed by the assembly of a shaft, a dish, a cover, and a lid. The only difference is that the head used to make cotton candy from hard candy utilizes a different lid. In the case of cotton candy made from granulated sugar, the lid has a top surface which is flat with an annular ring which extends slightly into the cover. In the case of the head utilized to make cotton candy from hard candy, the lid, instead of having a completely flat upper surface, has a raised portion at its inside annular ring forming a raised lip.

By having a raised lip, a slightly larger gap is available to hold the hard candy so that in between the lid and the cover the spacing is such that the hard candy will not get jammed between the lid and the cover while the head is spinning.

BRIEF DESCRIPTION OF THE DRAWINGS

FIG. 2 is an exploded view showing the various components used to form the rotating head of the invented cotton candy machine.

FIGS. 3a-3c show the rotating head of the invented cotton candy machine in perspective, elevation and top plan views.

DETAILED DESCRIPTION OF THE INVENTION

Figure 1A:
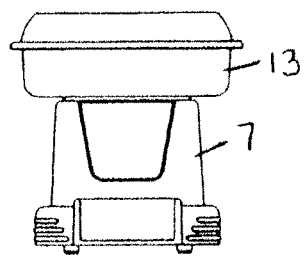
FIG. 1a is a front elevation view of the invented cotton candy machine.
Figure 1B:
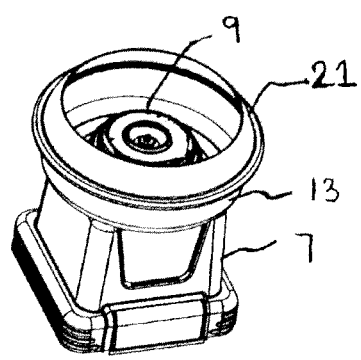
FIG. 1b is a perspective view of the invented cotton candy machine.

Referring first to FIGS. 1a and 1b, a front elevation and perspective view of the invented cotton candy maker are shown. The cotton candy maker includes a base 7, rotating head 9, and bowl 13.

Although not shown, the base includes a motor which rotates the spinning head, and a heater for heating a dish portion of the rotating head. As is well known, for proper operation, the heating unit should be capable of maintaining a temperature in the dish 27 of at approximately 270°-350° Fahrenheit to ensure proper melting of the sugar or hard candy without burning.

The rotating head should spin at approximately 3200 rpm, or greater, in order to properly form sugar filaments used to form the cotton candy.

Referring next to FIG. 2, an exploded view of head 9 is illustrated showing its relative relationship to bowl 13 and a protective ring 21 and functions to limit the expulsion of candy filaments from the device when the head is rotating at high speed. As shown in FIG. 2, the head includes a shaft 23 having a threaded upper portion, a washer 25, dish 27, cover 29, lid 31, washer 33, nut 35, and rivets 37. Instead of rivets, other means of fastening can be used, not limited to but including crimping, welding and/or screws. Lid 31 sits on top of cover 29 which sits inside dish 27. The shaft is held in place centered on dish 27 by the screw on the top portion of shaft 23 which is held in place by nut 35, and washers 25 and 33. Cover 29 is held in place between dish 27 and lid 31 by rivets 37 which extend through lid 31 into dish 27. Preferably, the bottom portion of cover 29 is positioned within dish 27 so that it is centered and held in place by an adhesive to dish 27. When lid 31 is affixed to the rivets 37, the top portion of cover 29 is flush with the bottom of lid 31 effectively forming a seal there between. Thus, although there is a small cavity formed between the outside portion of cover 29, and the inside portion of dish 27, since the bottom of cover 29 is flush with the bottom of dish 27, and the top of cover 29 is flush with the bottom of lid 31, that small cavity is filled with air and is not used during operation of the device. The cavity which is formed between the bottom of lid 31, and the inside portion of cover 29 is a space within which hard candy is placed from which it is melted, and then spun into cotton candy.

Further details of the construction of head 9 can be seen with reference to FIGS. 3a, 3b, and 3c, FIG. 3a is a top side perspective view of the head. Referring first to FIG. 3a, lid 31 is shown as including a raised lip 41 which forms an annular ring around the inside periphery of lid 31. A portion of the raised lip designated by reference number 43 extends downward from the top of the lip into the cavity formed by the opening between lip 41 and cover 29. Although precise dimensions are not important to a proper understanding of the invention, or required for proper operation, in a preferred embodiment, the total distance between the bottom of the shaft 23, and the top of lip 41 is 45 millimeters. The distance between the bottom of dish 27 and the top of lip 41 is 18 millimeters. The diameter of the head is 111 millimeters with the inside annular ring having a diameter of 56 millimeters. The height of lip 41 is 3 millimeters. The portion 43 of lip 41 extending into the cavity is approximately 2 millimeters. The dimensions are best seen with reference to FIG. 3c which is a side elevation view of the head. FIG. 3b is a top plan view of the head with the reference numbers in all figures corresponding to the same elements shown in FIGS. 3a and 3c.

In one embodiment, head 9 can be lifted out of bowl 13. In its place, another head (not shown) is inserted. The other head is essentially identical to the head shown in FIGS. 3a-3c. The only significant difference is that in the alternate embodiment, lid 31 has a flat top surface, that is, without a lip 41. Further details regarding the alternate head are not provided since the alternate head is well known in the art and is part of a cotton candy machine sold by Nostalgia Electrics under its model number RCM-605.

Figure 4:
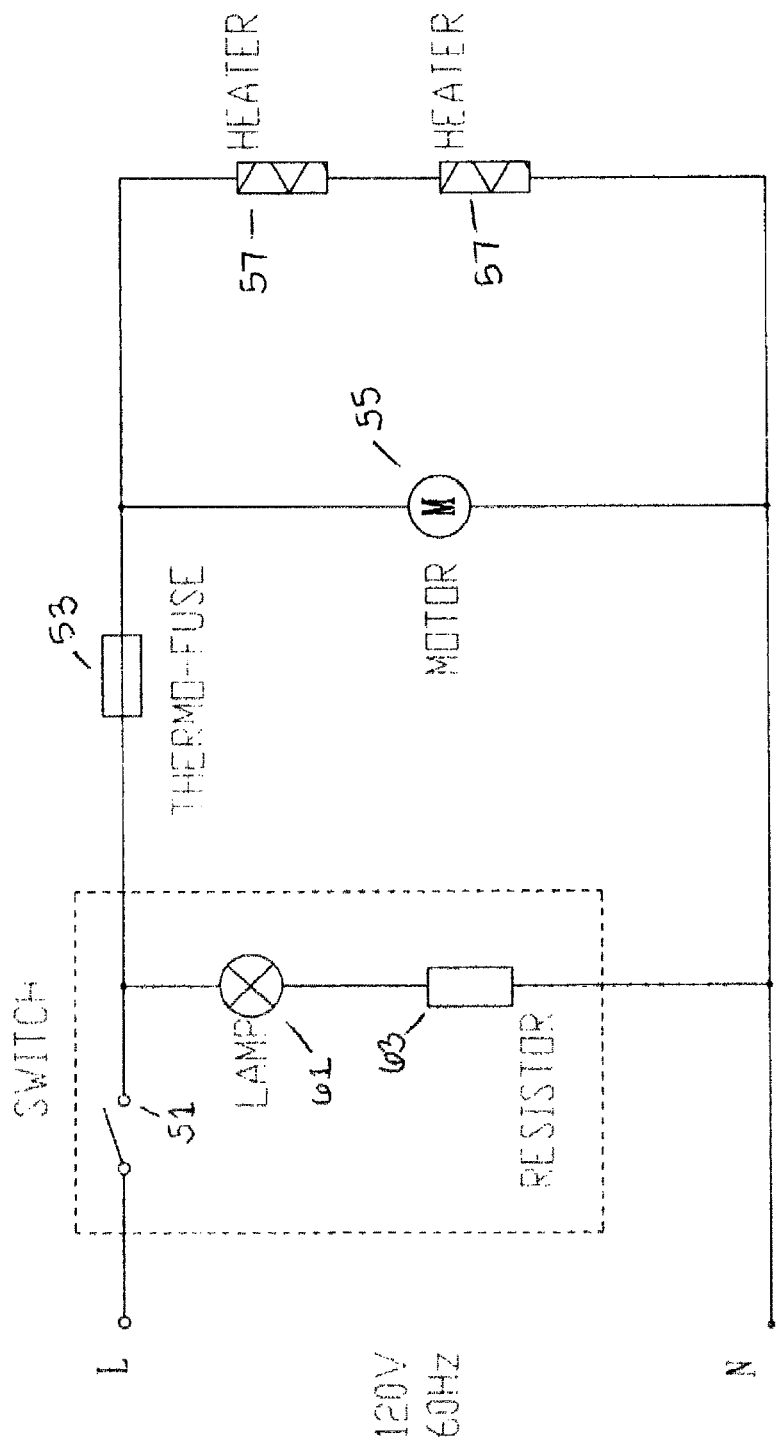
FIG. 4 is a schematic showing the electrical and other mechanical components used by the invented cotton candy machine.

FIG. 4 is a schematic diagram showing the electrical components used by the invented cotton candy maker which are all located in base 7 (see Figures la and The elements include an on/off switch 51, thermo-fuse 53, motor 55, and heater elements 57. The heating elements can be, but are not limited to heating coil, halogen light, or gas. Also shown, although not needed for proper operation are lamp 61 and resistor 53 with the lamp illuminating when switch 51 is closed to show that the status of the device is on. Resistor 63 is used to provide the proper voltage to lamp 61 depending upon the specifics of the voltage which is applied for operation of the device. Assuming a typical electrical input of 120 volts, 60 Hz, specifics of the components used are well known to persons skilled in the art and, therefore, are not set forth herein. The only requirements are that the motor be capable of spinning at a high enough speed to form filaments from the melted candy, and the heater being capable of heating dish 27 to a temperature as specified above. Typical heating elements would require power of approximately 450 Watts to obtain the desired temperature at 120 volts. However, the specifics of the heating elements used could change the wattage requirements which of course would also change depending on the voltage. However, such details are not important to a proper understanding of the invention and are well known in the art.

In operation, hard candy is placed into opening 45. When the unit is turned on, a heating element under dish 27 heats the dish, and the cover to a temperature of at least approximately 270°-350° Fahrenheit which will melt the hard candy. As the hard candy is melting, head 9 begins to spin with lip 41 preventing the hard candy from being expelled from the cavity as the head is rotating. As the candy melts, sugar filaments or strands begin to form extending from the top of lip 41 to bowl 13 which can be captured by a cone which can be made using, by way of example only, a suitable stiff paper rod, wood or plastic inserted between the spinning head and stationary bowl. The cotton candy forms on the cone in a manner well known in the art.

We claim:

1. A cotton candy machine comprising:
  a) a base including a switch, motor and heater;
  b) a head including:
    a shaft removably coupled to the motor,
    a dish coupled to the shaft and heatable by said heater when said shaft is coupled to the motor,
    a cover disposed between said dish and a lid, said shaft, cover and lid in a fixed relationship relative to each other, said dish cover and said lid forming a cavity there between configured to receive hard candy which is meltable within said dish when said dish and cover combination is heated to a predetermined temperature;
    wherein said lid further comprises a lip formed on a top surface of the lid around an inner annular ring portion of said lid, said lip having a bottom portion attached to said top surface of the lid at a top portion extending from said bottom portion, said top portion having a smaller circumference than said bottom portion, said lip configured to enable said hard candy, when melted, and said head is rotating at a predetermined speed, said shaft forming an axis around which said head is rotating, to form strands or threads which are collectable as cotton candy.

2. The cotton candy machine defined by claim 1 wherein said lip has a height of about 3 mm above said top surface.

3. The cotton candy machine defined by claim 1 further comprising a second head removably coupled to the motor, said second head configured to make cotton candy using granulated sugar.

4. The cotton candy machine defined by claim 1 wherein said predetermined speed is at least approximately 3200 rpm.

5. The cotton candy machine defined by claim 1 wherein said predetermined temperature is at least approximately 270° Fahrenheit.

6. A head for use in a cotton candy machine comprising:
  a) a shaft configured to be removably coupled to a motor,
  b) a dish coupled to the shaft and heatable by a heater when said shaft is coupled to the motor,
  c) a cover disposed between said dish and a lid, said shaft, cover and lid in a fixed relationship relative to each other, said dish cover and said lid forming a cavity there between configured to receive hard candy which is meltable within said dish when said dish and cover combination is heated to a predetermined temperature;
  wherein said lid further comprises a lip formed on a top surface of the lid around an inner annular ring portion of said lid, said lip having a bottom portion attached to said top surface of the lid at a top portion extending from said bottom portion, said top portion having a smaller circumference than said bottom portion, said lip configured to enable said hard candy, when melted, and said head is rotating at a predetermined speed, said shaft forming an axis around which said head is rotating, to form strands or threads which are collectable as cotton candy.

* * * * *